(12) United States Patent
Agahi-Kesheh et al.

(10) Patent No.: US 6,466,768 B1
(45) Date of Patent: Oct. 15, 2002

(54) MULTI-BAND FILTER SYSTEM FOR WIRELESS COMMUNICATION RECEIVER

(75) Inventors: Darioush Agahi-Kesheh; James R. Snider, both of Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/330,646

(22) Filed: Jun. 11, 1999

(51) Int. Cl.$^7$ .............................. H04B 1/44; H04B 1/38
(52) U.S. Cl. ...................... 455/78; 455/180.1; 455/307; 455/553; 330/133
(58) Field of Search ................................ 455/307, 213, 455/306, 14, 78, 207, 280, 281–282, 552–553, 337–339, 180.1, 188.1, 191.1, 191.3; 333/134, 126, 132, 133

(56) References Cited

U.S. PATENT DOCUMENTS

| | | | |
|---|---|---|---|
| 5,068,918 A | * 11/1991 | Verheijen et al. | 455/188.1 |
| 5,187,803 A | * 2/1993 | Sohner et al. | 455/14 |
| 5,307,284 A | * 4/1994 | Brundeldt et al. | 364/485 |
| 5,483,209 A | * 1/1996 | Takayama | 333/174 |
| 5,883,553 A | * 3/1999 | Tsumura | 333/174 |
| 5,926,466 A | * 7/1999 | Ishida et al. | 370/280 |
| 6,035,185 A | * 3/2000 | Dobrovolny et al. | 455/188.1 |
| 6,043,725 A | * 3/2000 | Taguchi et al. | 333/132 |

OTHER PUBLICATIONS

"EE&CS: EE530; Smith Chart Notes"; Aston University, Electronic Engineering in EE&CS, at http:melchett.aston.ac.uk/module/tt/1tns/Smithch_nts.html.
"Smith Chart"; Viewmark, Inc., at http:www.viewmark.com/tech/java/SChart.html.
"The Smith Chart: What is it?"; D. Jefferies, Jan. 11, 1999, at http://www.ee.surrey,ac.uk/Personal/D.Jefferies/smith.html.
"Filter Subsystems"; A. Greenberg, RS Microwave Company, Inc., Oct., 1996, at http:www.rfglobalnet.com/library/productnotes/files/6/tecorn 10.htm.

* cited by examiner

Primary Examiner—William Trost
Assistant Examiner—Simon Nguyen
(74) Attorney, Agent, or Firm—Procopio, Cory, Hargreaves & Savitch, LLP

(57) ABSTRACT

A filter system comprising three or more filters, each having different passbands, and an impedance adjusting network coupled between a filter system ports and each of the ports of at least two of the filters to adjust the port impedances of the filters coupled to the network. The adjusted port impedance of each filter at a frequency representative of at least one of the other filters coupled to the network is at a non-loading level. In one embodiment, the filter system is configured for use in a wireless communication receiver and/or handset.

15 Claims, 16 Drawing Sheets

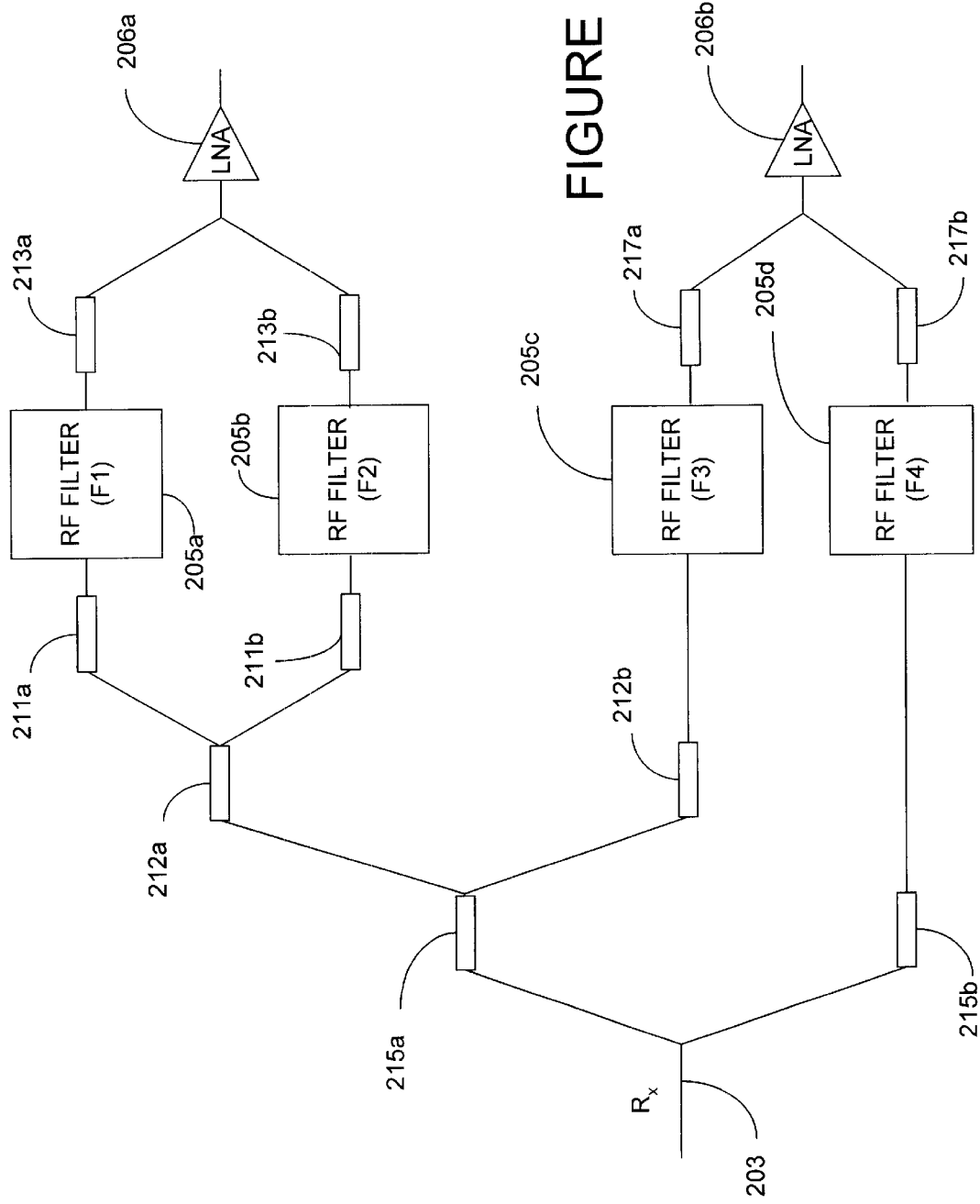

MULTI-BAND FILTER SYSTEM FOR WIRELESS COMMUNICATION RECEIVER

BACKGROUND OF THE INVENTION

I. Field of the Invention

This invention relates generally to the field of mobile wireless communications receivers, and more particularly, to a wireless communications receiver capable of operation in multiple frequency bands.

II. Background of the Invention

In recent years, multiple wireless communications standards have been deployed governing the wireless interface between base stations and the mobile handsets serviced by the base stations. A geographical area is divided into a plurality of cells, each corresponding to a base station, and with the mobile handsets in a cell serviced by the base station corresponding to the cell. The base stations in turn are linked to a base station controller which in turn are linked to the Public Switched Telephone Network (PSTN) through one or more E1/T1 lines.

The GSM (Global System for Mobile Communications) is a standard based on TDMA (Time Division Multiple Access) technology that governs wireless communications over much of Europe. The DCS (Digital Cellular System) is a TDMA-based standard that governs at least some of the wireless communications in Great Britain, and other parts of Europe. The PCS (Personal Communications System) is a TDMA-based standard that is being deployed in North America.

Each of these standards define narrow band systems which apply over different passbands. For example, the receive band for the mobile side of the extended GSM (E-GSM) standard is 925–960 MHz; that for the DCS standard is 1805–1880 MHz respectively; and that for a version of the PCS standard known as PCS 1900 is 1930–1990 MHz. The channel bandwidth for the E-GSM, GSM, PCS, and DCS standards is 200 kHz. As is known, TDMA is a technology in which each frame of information transmitted over the wireless interface is divided into a predetermined number of time slots, wherein a caller is assigned one of these slots for the duration of the call. Other wide band standards have been deployed, such as the IS-95A standard, which are based on CDMA (Code Division Multiple Access) technology. Additional detail about the GSM standard is available from the European Digital Cellular Telecommunications Systems GSM Recommendation 05.05, which is hereby fully incorporated by reference herein as though set forth in full. Additional detail about the PCS1900 standard is available from T1P1.5, the appropriate U.S. based standards committee.

Each of the foregoing three TDMA-based standards—E-GSM, DCS, and PCS—largely governs distinct geographical areas around the world. Moreover, no one of these three standards has yet achieved universal worldwide coverage. On the other hand, users are demanding mobile universal coverage from a single handset, and are understandably resistant to the need to carry around multiple handsets to deal with the different standards that are likely to be encountered.

Dual mode handsets are configured to handle two of the standards likely to be encountered. However, unique problems exist which have heretofore prevented extension of this development to a handset capable of handling three or more bands. One such problem is the excessive loading caused on the receiver components for a selected band by the receiver components for the other two bands. Another problem is the excessive space consumed by the receiver components for the three different bands. This latter problem is particularly acute given the demands of users for compact and easily portable handsets.

Therefore, there is a need for a compact, mobile wireless communications handset and/or receiver which is capable of handling wireless communications in accordance with any of the foregoing three TDMA-based wireless communications standards.

SUMMARY OF THE INVENTION

In accordance with the purpose of the invention as broadly described herein, there is provided a filter system comprising three or more filters each having a port, and each having a passband, wherein a first impedance adjusting network is coupled to the ports of each of at least two of the filters and at least one filter system port. The impedance adjusting network is configured to adjust the port impedances of each of at least two of the filters coupled to the network such that each of the adjusted port impedance of each the at least two filters coupled to the network, at a frequency representative of the passband of at least one of the other filters coupled to the network, is at a non-loading level.

In one embodiment, the first impedance adjusting network is coupled between at least one filter system input and the inputs of at least two of the filters. In this embodiment, the impedance adjusting network is configured to adjust the input impedances of each of the at least two filters coupled to the network to be at a non-loading level at a frequency representative of the passband of at least one of the other filters coupled to the network. In a second embodiment, the first impedance adjusting network is coupled between the outputs of at least two of the filters and at least one filter system output. In this embodiment, the impedance adjusting network is configured to adjust the output impedances of each of the at least two filters coupled to the network to be at a non-loading level at a frequency representative of the passband of at least one of the other filters coupled to the network.

In a third embodiment, which is dependent on the first embodiment, a second impedance adjusting network is coupled to the outputs of each of at least two of the filters, wherein the first network is configured so that the adjusted input impedance of each filter at a frequency within the passband of at least one of the other filters is at a non-loading level, and wherein the second network is configured so that the output impedance of each filter coupled to the second network at a frequency within the passband of the other filter is at a non-loading level.

In one implementation, a non-loading level of an impedance is defined as infinite impedance as indicated on a Smith chart. In one embodiment, the filter system is an element of a wireless communications receiver and/or handset.

In one implementation, the first impedance adjusting network comprises third and fourth impedance adjusting networks. The third impedance adjusting network is coupled to the inputs of two of the filters. The third impedance adjusting network is configured to adjust the input impedance of each of the two filters at a frequency representative of the passband of the other of the two filters, and vice-versa, so that the adjusted input impedance appears infinite. The third impedance adjusting network has an input. The fourth impedance adjusting network is coupled to the output of the third network and the input of a third filter. The fourth network is configured to adjust the input impedance of the third network at a frequency representative of the passband of the third filter, so that the adjusted input impedance appears infinite, and to adjust the input impedance of the third filter at a frequency representative of the passbands of the first and second filters, again, so that the adjusted input impedance appears infinite.

In one implementation example, the first filter is a filter having a passband generally coincident with the DCS band, the second filter is a filter having a passband generally coincident with the PCS band, and the third filter is a filter having a passband generally coincident with the E-GSM or GSM bands.

In one implementation, a first transmission line is coupled at one end to the input of the first filter, a second transmission line is coupled at one end to the input of the second filter, and the other ends of the two transmission lines are coupled together to form a first node. The length of the first line is such that the adjusted input impedance of the first filter, at the center frequency of the passband of the second filter, is indicated on a Smith chart as being infinite. The length of the second line is such that the adjusted input impedance of the second filter, at the center frequency of the passband of the first filter, is indicated on a Smith chart as being infinite.

A third transmission line is coupled at one end to the output of the first filter, and a fourth transmission line is coupled at one end to the output of the second filter. The other ends of the third and fourth transmission lines are coupled together to form a second node. The length of the third line is such that the adjusted output impedance of the first filter, at the center frequency of the passband of the second filter, is indicated on a Smith chart as being infinite. The length of the fourth line is such that the output impedance of the second filter, at the center frequency of the passband of the second filter, is indicated on a Smith chart as being infinite.

A fifth transmission line is coupled at one end to the first node, and a sixth transmission line is coupled at one end to the input of the third filter. The other ends of the fifth and sixth transmission lines are coupled together to form a third node. The length of the fifth line is such that the adjusted input impedance at the first node, at the center frequency of the passband of the first filter, is indicated on a Smith chart as being infinite. The length of the sixth line is such that the input impedance of the third filter, at a frequency representative of the passbands of the first and second filters, is indicated on a Smith chart as being infinite.

In one implementation example, the required lengths of transmission lines are determined using the formula:

$$\Delta X \times \frac{c \times K}{f_c \times v_p}$$

where $\Delta X$ is the required length of the transmission line in terms of $\lambda$ (wavelength), c is the speed of light in meters per second ($3 \times 10^8$ m/sec.), K is a conversion constant for converting to a desired unit of physical length, $f_c$ is the center frequency of the passband of another one of the filters, and $v_p$ is the velocity of propagation through the material making up the line. According to this implementation example, $\Delta X$ is determined as the length of line required to move the location of the reflection coefficient measured at the filter port to a point indicative of infinite impedance on a Smith chart.

In a fourth embodiment, a filter system is provided comprising n filters, wherein n is an integer equal to three or more, each of the filters having a passband, a port, and a port impedance. A first impedance adjusting network is coupled to the ports of each of at least two of the filters, and at least one filter system port. The first impedance adjusting network is configured to adjust the port impedance of the at least two filters at a frequency characteristic or representative of at least one of the other filters coupled to the network, such that the adjusted port impedance is at a non-loading level. In a first implementation, the first impedance adjusting network is coupled between at least one filter system input, and the inputs of at least two of the filters, and is configured to adjust the input impedance of each of the at least two filters coupled to the network at a frequency representative of the passband of at least one of the other filters coupled to the network such that the adjusted input impedance of each of the at least two filters is at a non-loading level. In a second implementation, the first impedance adjusting network is coupled between the outputs of at least two of the filters, and at least one filter system output, and is configured to adjust the output impedance of each of the at least two filters coupled to the network at a frequency representative of the passband of at least one of the other filters coupled to the network such that the adjusted output impedance of each of the at least two filters is at a non-loading level.

In a fifth embodiment, dependent on the foregoing first implementation, a second impedance adjusting network is coupled between the outputs of at least two of the filters and at least one filter system output, wherein the second impedance adjusting network is configured to adjust to a non-loading level the output impedance of each of the at least two filters coupled to the network at a frequency characteristic or representative of the passband of at least one of the other filters coupled to the network.

A method of operation comprises the steps of receiving an RF signal, passing the signal through one of n filters, wherein n is an integer equal to three or more, the one filter having a passband corresponding to the frequency of the signal, while substantially blocking passage of the signal through each of the other filters, and outputting the filtered signal.

A method of implementation comprises the steps of providing n filters, wherein n is an integer equal to three or more, adjusting a port impedance of at least one of the filters so that the adjusted port impedance of each of the at least one filters at a frequency within the passband of at least one of the other filters is at a non-loading level, and performing the foregoing steps for at least one of the other filters.

BRIEF DESCRIPTION OF DRAWINGS

FIGS. 7A–7C illustrate additional embodiments or variants of embodiments within the scope of the subject invention.

DESCRIPTION OF THE PREFERRED EMBODIMENTS

I. Example Environment

Figure 1:
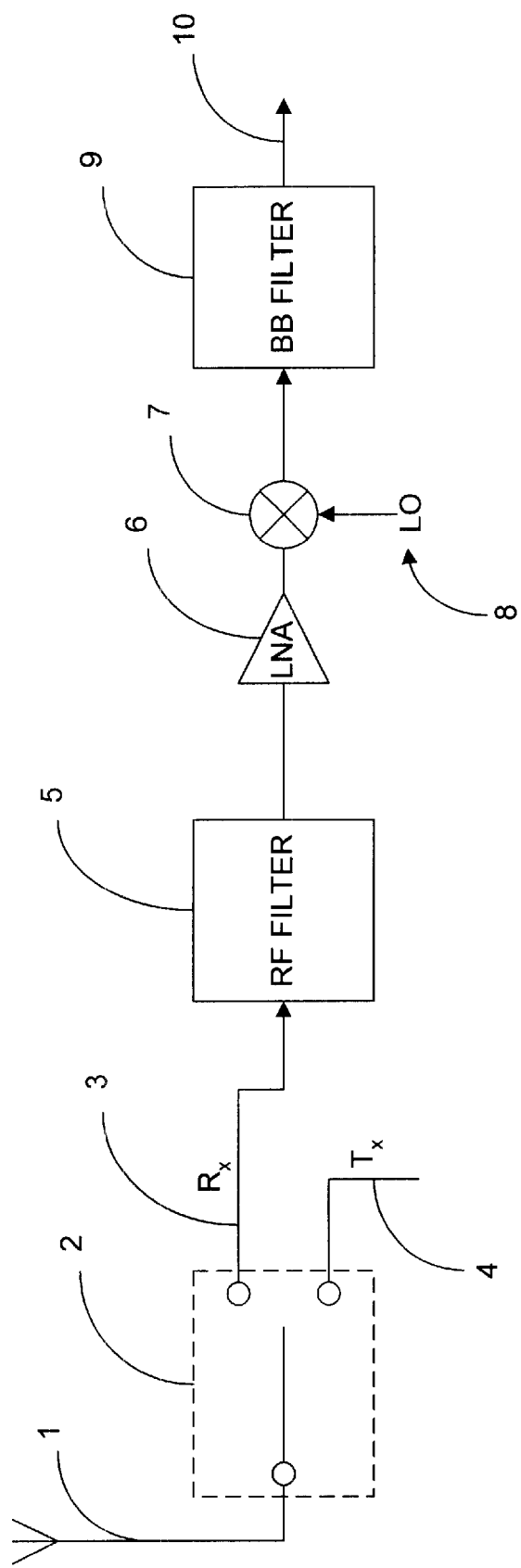
FIG. 1 illustrates a receiver system configured for application is a wireless communication system.

A receiver system configured for use in a mobile wireless communication handset is illustrated in FIG. 1. The system represents an example environment for the filter system of the subject invention. As indicated, the receiver system comprises antenna 1, switch 2, RF filter 5, low noise amplifier (LNA) 5, mixer 7, local oscillator (LO) 8, baseband (BB) filter 9, and output 10. The antenna 1 is configured to receive a radio frequency (RF) signal; the switch 2 is configured to switch the antenna between a receive signal path 3, and a transmit signal path 4, depending on the desired mode of operation, whether receive or transmit mode. The focus of the present discussion is the receive signal path. Therefore, the transmit signal path, and the components of a transmitter which are typically situated along that path, will not be discussed in detail.

The RF filter 5 is situated along the receive path 3. It is configured to bandlimit the incoming signal to the desired RF frequency band of operation, which can differ depending on the applicable wireless communication standard. For example, the receive band for the mobile side of the E-GSM standard is 925–960 MHz; that for the DCS standard is 1805–1880 MHz respectively; and that for the PCS1900 standard is 1930–1990 MHz. The passband of the RF filter is configured to encompass the receive band of the applicable wireless standard.

LNA 6 is configured to amplify the signal after passage through RF filter 6. Mixer 7 is configured to mix the incoming signal with the LO signal 8 to produce, in one or more stages, an output signal at baseband frequencies, and an output signal at higher frequencies. The frequency of the LO signal 8 is typically adjusted in accordance with the desired channel of operation. For the GSM, E-GSM, PCS, and DCS standards, a channel is a 200 kHz slot within the corresponding receive band.

The BB filter 9 is configured to filter out the high frequency component of the incoming signal, and to retain the baseband component. The baseband component is provided to output 10.

II. Preferred Embodiments

Figure 3:
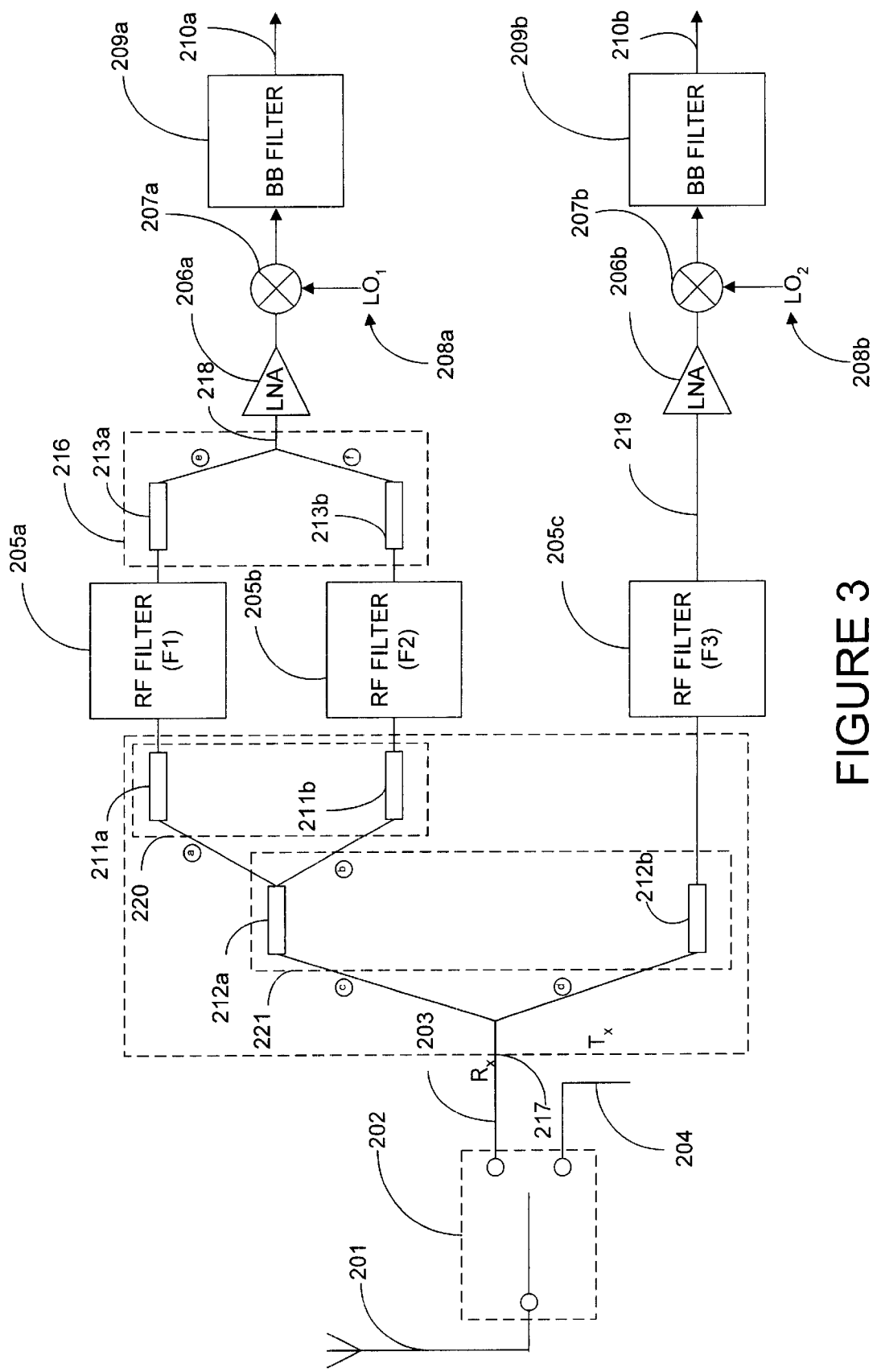
FIG. 3 illustrates a first embodiment of a receiver system configured in accordance with the subject invention.

FIG. 3 illustrates a first embodiment of a filter system in accordance with the subject invention in the example environment of FIG. 1. The filter system comprises RF filters 205a, 205 b, and 205c, each having distinct passbands. The center frequencies of the passbands of filters 205a and 205b are close when compared to the center frequency of the passband of filter 205c. The situation is illustrated in FIG. 4D, in which representations of the passbands of filters 205a and 205b are identified with numerals 301 and 302 respectively, and a representation of the passband of filter 205c is identified with numeral 300. As indicated, each of the passbands has a center frequency, identified in the figure as $f_1$, $f_2$, and $f_3$, respectively. In one implementation, the passband for filter 205a, passband 301, is generally coincident with the DCS receive band; the passband for filter 205b, passband 302, is generally coincident with the PCS receive band; and the passband for filter 205c, passband 300, is generally coincident with the GSM receive band.

A first impedance adjusting network 215 is coupled to the inputs of at least two of the three filters. The first impedance adjusting network 215 is configured so that the input impedance of each filter coupled to the network is set to a non-loading level at a frequency representative of the passband of another one of the filters coupled to the network. In one implementation example, a non-loading level is defined as infinite impedance as indicated on a Smith chart. A second impedance adjusting network 216 is coupled to the outputs of at least two of the filters. For purposes of illustration only, the impedance adjusting network 216 is shown as being coupled to the outputs of filters 205a and 205b. The second impedance adjusting network 216 is configured so that the output impedance of each of the filters coupled to the network is set at a non-loading level at a frequency representative of the passband of another of the filters coupled to the network.

In one implementation, the first impedance adjusting network 213 comprises third impedance adjusting network 220 and fourth impedance adjusting network 221. According to this implementation, third impedance adjusting network 220 comprises transmission lines 211a and 211b, and fourth impedance adjusting network comprises transmission lines 212a and 212b. In one implementation example, each of the transmission lines is a material having a characteristic impedance such as a coaxial cable, a balanced pair, a microstrip, a trace on a printed circuit board (PCB), a network of repeating stages, wherein each stage comprises series capacitance and a shunt inductance, or a series inductance and a shunt capacitance, or one or more passive components selected from the group including a shunt capacitance, a series capacitance, a shunt inductance, and a series inductance.

In accordance with this implementation example, the characteristic impedance of line 211a is matched to the impedance of filter 205a determined at the center frequency of the passband of filter 205a. Similarly, the characteristic impedance of line 211b is matched to the impedance of filter 205b determined at the center frequency of the passband of filter 205b. In addition, the length of line 211a is such that the input impedance of filter 205a as adjusted by line 211a, that is, at node a, appears infinite as indicated on a Smith chart at the center frequency of the passband of filter 205b. Similarly, the length of line 211b is such that the input impedance of filter 205b as adjusted by line 211b, that is, at node b, appears infinite as indicated on a Smith chart at the center frequency of the passband of filter 205a.

The characteristic impedance of line 212a is matched to the impedance of filter 205a determined at center frequency of the passband of filter 205a, which is assumed to be equal to the impedance of filter 205b determined at the center frequency of the passband of filter 205b. The length of line 212a is determined such that the input impedance at node c appears infinite when determined at the center frequency of the passband of filter 205c.

The characteristic impedance of line 212b is matched to the impedance of filter 205c when determined at the center frequency of the passband of filter 205c. In addition, the length of line 212b is determined such that the input impedance of filter 205c as adjusted by line 212b, that is, at node d, appears infinite at a frequency representative of the passbands of filters 205a and 205b. In one implementation example, the center frequencies of the passbands of filters 205a and 205b are assumed to be similar, such that it is possible to determine a frequency characteristic of both passbands. One example is the case in which filter 205a is configured to have a passband generally coincident with the PCS band, filter 205b is configured to have a passband generally coincident with the DCS band, and filter 205c is configured to have a passband generally coincident with the E-GSM or GSM bands. In this example, since the center frequencies of the PCS and DCS bands are similar in relation to the center frequency of the E-GSM band, it is possible to define a frequency which is characteristic or representative of both passbands, such as the average of the center frequencies of the two passbands.

In one implementation, the second impedance adjusting network 216 comprises duplexing lines 213a and 213b. For purposes of this disclosure, a duplexing line is a transmission line configured to couple two filter circuits to a common port, whether an input or an output. The characteristic impedance of duplexing line 213a is matched to the impedance of filter 205a at the center frequency of its passband. In addition, the length of duplexing line 213a is such that the output impedance of filter 205a as adjusted by line 213a, that is, the output impedance at node e, is at a non-loading level at the center frequency of the passband of filter 205a. Similarly, the characteristic impedance of duplexing line 213b is matched to the impedance of filter 205b at the center frequency of its passband. In addition, the length of duplexing line 213b is such that the output impedance of filter 205b as adjusted by line 213b, that is, the output impedance at node f, is at a non-loading level at the center frequency of the passband of filter 205a.

The filter system of FIG. 3 has an input 217, and two outputs 218 and 219. The input 217 is coupled to the receive line 203 of switch 202, the input of which is coupled to antenna 201. The output 218 is coupled to LNA 206a, and the output of LNA 206a is coupled to mixer 207a. Mixer 207a is configured to mix the incoming signal from LNA 206a with the local oscillator signal LO$_1$, identified in the figure with numeral 208a. The output of mixer 207a is coupled to BB filter 209a, and the output of BB filter 209a is provided on signal line 210a.

Similarly, the output 219 of the filter system is input to LNA 206b, and the output of LNA 206b is input to mixer 207b. Mixer 207b is configured to mix the incoming signal from LNA 206b with the local oscillator signal LO$_2$, identified in the figure with numeral 208b. The output of mixer 207b is provided to BB filter 209b, and the output of BB filter 209b is provided on signal line 210b.

In the embodiment of FIG. 3, it can be seen that filters 205a and 205b share a common LNA, identified with numeral 206a, while filter 205c is provided with its own LNA, identified with numeral 206b. This arrangement stems from the nature of the center frequencies of the passbands of filters 205a, 205b, and 205c, and the limited bandwidth available with current LNAs. Since the center frequencies of the passbands of filters 205a and 205b are similar compared to the center frequency of the passband of filter 205c, it is possible with current LNAs to service both filters with a single LNA. However, because the center frequency of the passband of filter 205c is much different from that of filters 205a and 205b, it must be provided with its own LNA, as current LNAs lack sufficient bandwidth to service all three filters. Given current technological trends, it is contemplated that the bandwidth of LNAs will increase with time such that a single LNA will be capable of servicing all three of filters 205a, 205b, and 205c. Consequently, a variant of the embodiment of FIG. 3 is expressly contemplated in which all three filters 205a, 205b, and 205c are serviced by a single LNA. In such a variant, the second impedance adjusting network 216 would be extended to receive inputs from each of the filters 205a, 205b, and 205c. Similarly, it is contemplated that the passbands of filters 206a, 205b, and 205c could be so dissimilar that each would require its own LNA. Consequently, a variant of the embodiment of FIG. 3 is expressly contemplated in which each of the filters 205a, 205b, and 205c are serviced by a distinct LNA. In such a variant, the second impedance matching network 216 would be avoided.

Similarly, in the embodiment of FIG. 3, a single switch 202 services all three filters 205a, 205b, and 205c, but it should be appreciated that embodiments are possible in which more than one switch is required to service the three filters, or in which only two of the filters share a common switch. For example, an embodiment is contemplated in which filters 205a and 205b are serviced by a single switch and filter 205c is serviced by its own switch, and in which fourth impedance adjusting network 212a is avoided.

Figure 2:
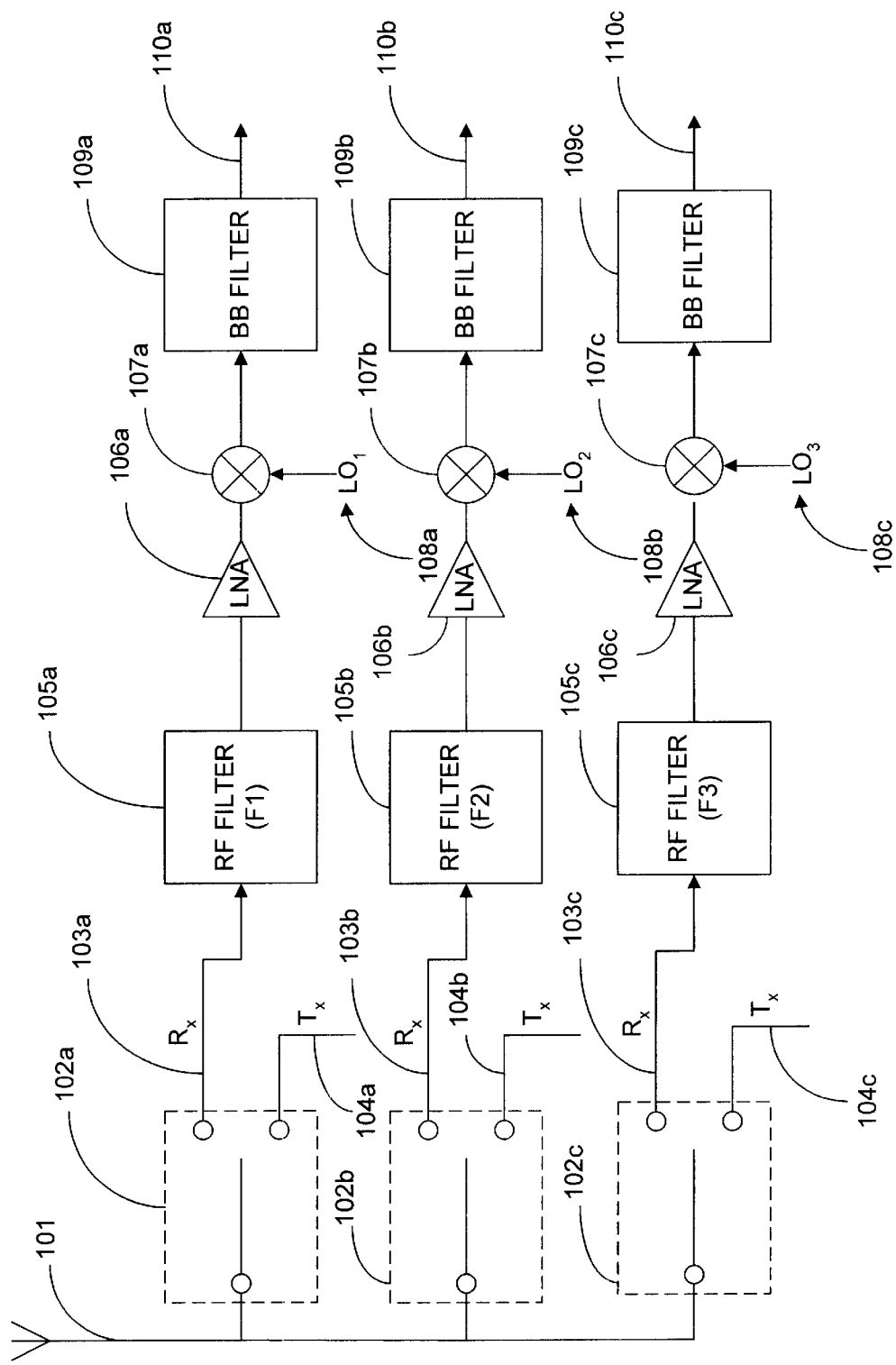
FIG. 2 illustrates a possible tri-band receiver system configured for application in a wireless communication system.

FIG. 2 illustrates a tri-band filter system in which a single-band filter system is essentially replicated three times. Thus, each of filters 105a, 105b, and 105c are serviced by its own switch 102a, 102b, and 102c, and by its own LNA 106a, 106b, 106c, and both first and second impedance adjusting networks 215 and 216 are avoided.

Compared to the structure of FIG. 2, the embodiment of FIG. 3, in which a single switch 202 is shared by the three filters 205a, 205b, 205c, and in which a single LNA 206a is shared by the two filters 205a, 205b, achieves significant resource sharing. Consequently, compared to FIG. 2, the embodiment of FIG. 3 would be expected to be more compact and mobile, and therefore more desirable to subscribers who, as stated earlier, highly value compactness and mobility.

In general, it is expressly contemplated that any variant of the FIG. 2 structure is within the scope of the subject invention in which an impedance adjusting network is provided to allow one or more of the filters 205a, 205b, and 205c to share a common port, whether an input port or an output port.

With reference to FIG. 3, in operation, an RF signal is received by antenna 201 and provided to signal line 203 by switch 202. If the signal is within the passband of filter 205a, it is routed through that filter. The signal is substantially blocked from passage through filter 205b and filter 205c because the impedance of these filters, at the frequency of the signal, appears infinite. Similarly, if the signal is within the passband of filter 205b, it is passed through that filter, and substantially blocked from passage through filters 205a and 205c. If the signal is within the passband of filter 205c, it is passed through that filter, and substantially blocked from passage through filters 205a and 205b. In one implementation, the signal can be within any of three frequency bands: the E-GSM or GSM bands, the PCS band, and the DCS band.

If the signal is routed to either of filters 205a and 205b, after passage through either of these filters, it is amplified by LNA 206a, and demodulated to baseband frequencies by mixer 207a and BB filter 209a. If the signal is routed to filter 205c, after passage through the filter, it is amplified by LNA 206b, and demodulated to baseband frequencies by mixer 207b and BB filter 208b.

In one implementation example, switch 202 is an RF switch, and each of filters 205a, 205b, 205c is a high-Q filter such as a ceramic filter, or a surface acoustic wave (SAW) filter. In one implementation, a SAW filter makes use of a single crystal, planar substrate with aluminum or gold electrode patterns fabricated by photolithography from a substrate of piezoelectric material. The electrode patterns are used to excite and detect minute acoustic waves that travel over the surface of the substrate.

III. Method of Implementation

Figure 4A:
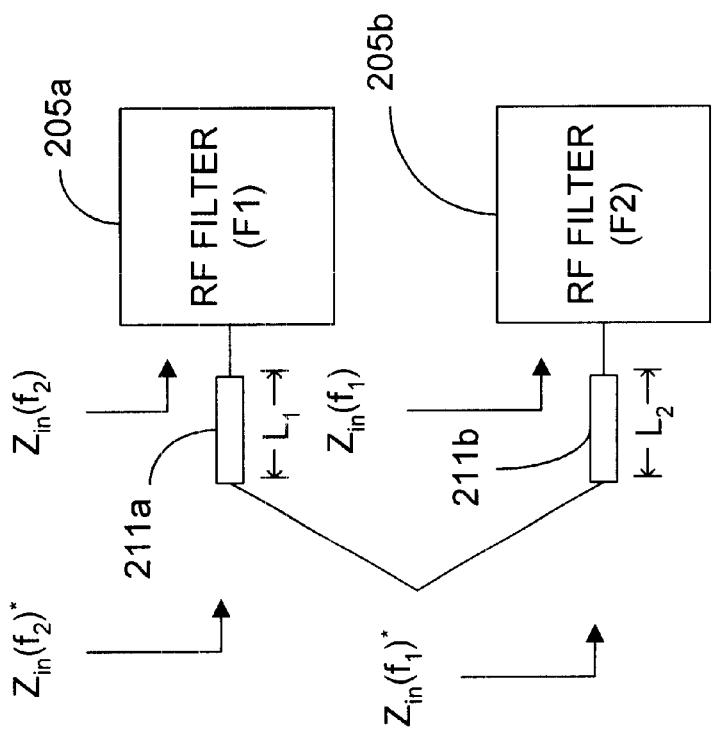
FIGS. 4A–4B illustrate a two-step procedure for adjusting the input impedances of the filters in the receiver system of FIG. 3.
Figure 4B:
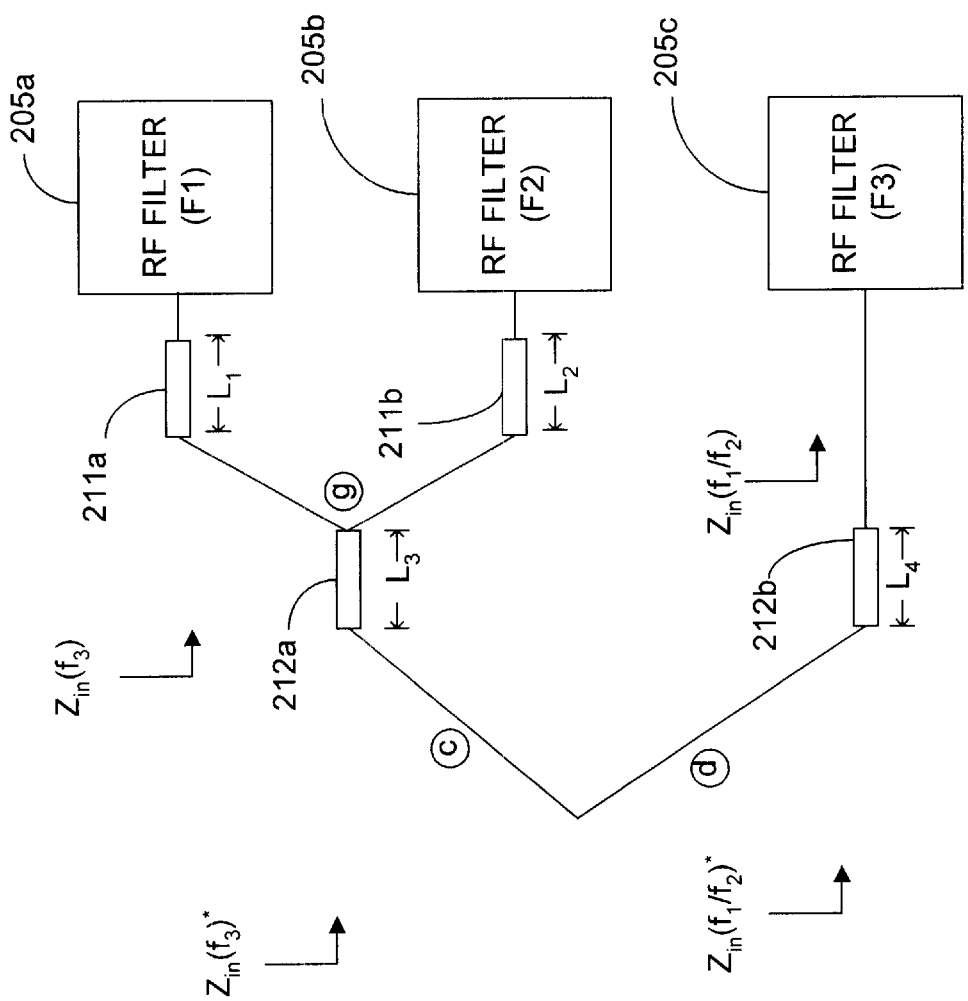
Figure 4C:
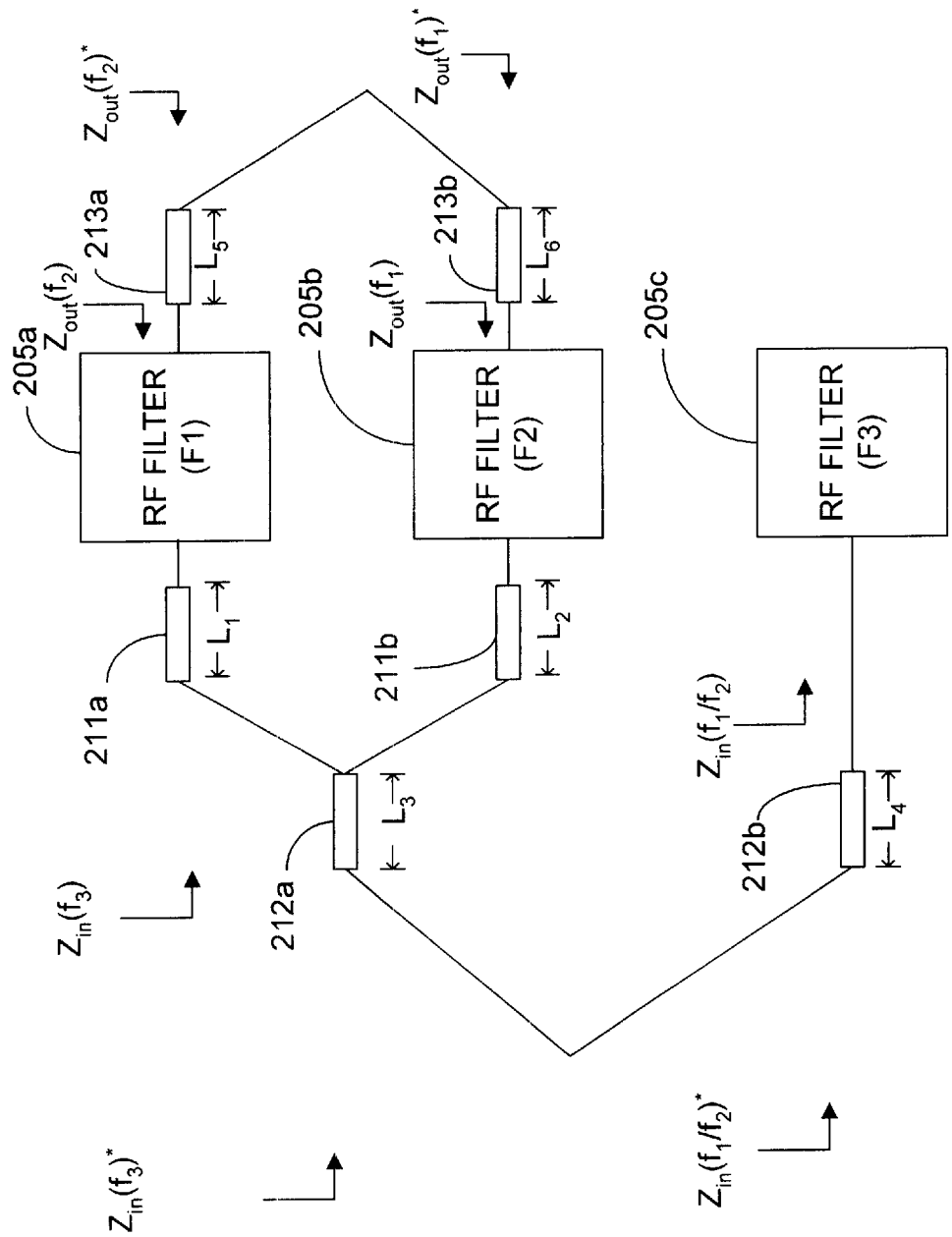
FIG. 4C illustrates a procedure for adjusting the output impedances of two of the filters in the receiver system of FIG. 3.
Figure 4D:
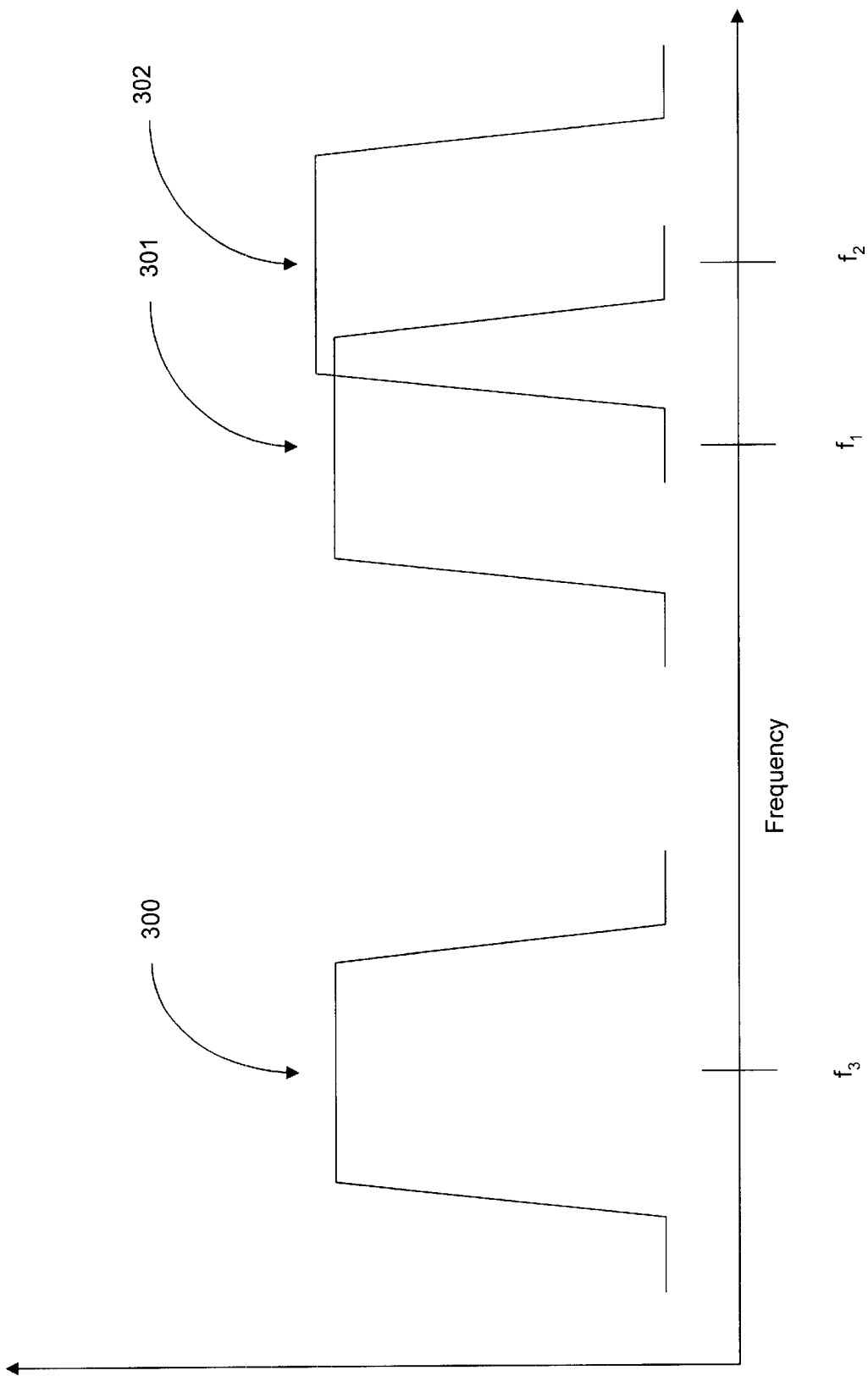
FIG. 4D illustrates the passbands of filters in one implementation of the receiver system of FIG. 3.
Figure 8A:
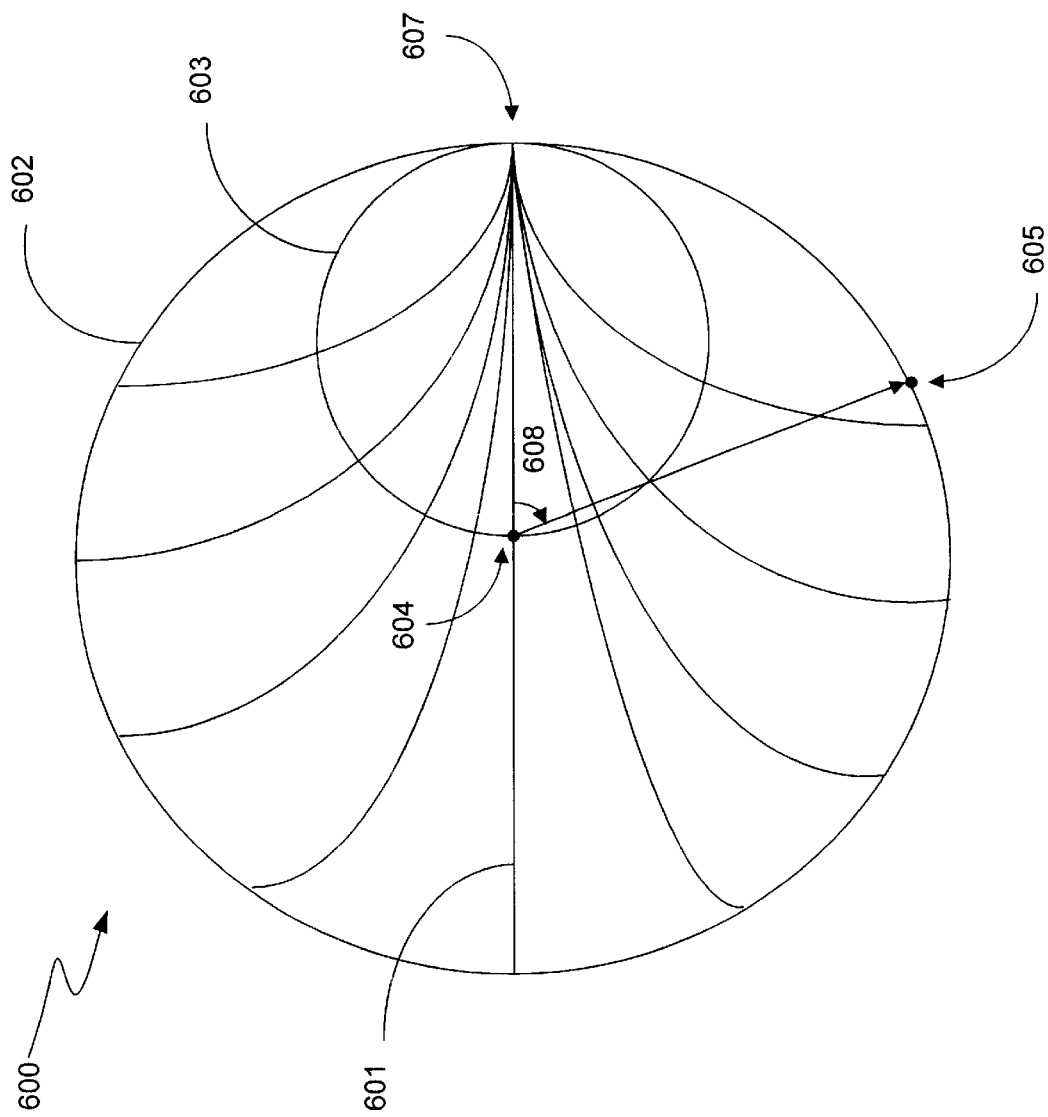
FIGS. 8A–8B illustrate the process of implementing the subject invention by adjusting the impedance of a filter at a frequency within the passband of an opposing filter.
Figure 8B:
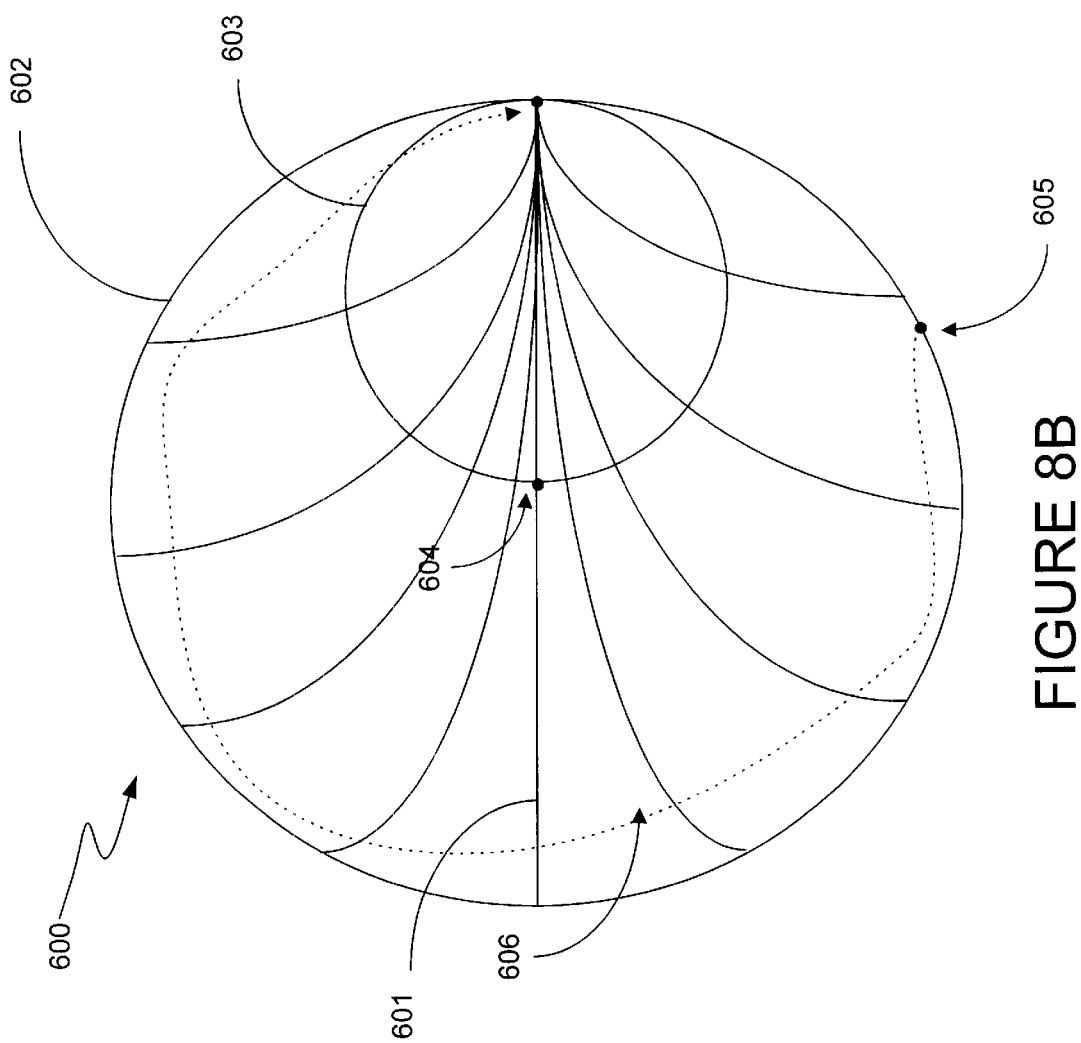

A first embodiment of a method of implementing the system of FIG. 3 is illustrated in FIGS. 4A–4C, in conjunction with FIGS. 8A–8B. In a first step, illustrated in FIG. 4A, the input impedance of filter 205a is measured at the center frequency $f_2$ of filter 205b. This value is referred to as $Z_{in}(f_2)$. Then, the length of line 211a, $L_1$, is determined so that the input impedance of filter 205a as adjusted by line 211a at the center frequency of filter 205b, $Z_{in}(f_2)^*$, appears infinite. This step is illustrated in FIGS. 8A–8B, which illustrate a representation of Smith chart 600, normalized with the characteristic impedance of the material used for line 211a. The perimeter of the Smith chart is identified with numeral 602, the unit circle on the Smith chart is referred to with numeral 604, and the horizontal axis on the Smith chart is referred to with numeral 601. With reference to FIG. 8A, the impedance of the filter 205a, at the center frequency of its passband, $f_1$, is identified with numeral 604, and the impedance of filter 205a, at the center frequency of the passband of filter 205b, $f_2$, is identified with numeral 605. As indicated, the impedance of the filter 205a at the center frequency of its passband is at the intersection of the horizontal axis 601, and the unit circle 603, indicating that this impedance is purely resistive, and matched to the characteristic impedance of line 211a. However, the impedance of the filter 205a at the center frequency of the passband of filter 205b is on the perimeter 602 of the Smith chart, indicating that the impedance is purely reactive.

The impedance 605 is associated with a corresponding phase angle of the reflection coefficient, Γ (or the parameter $S_{11}$), which phase angle is identified with numeral 608. The point of infinite impedance on the Smith chart is identified with numeral 607, and the next step is to determine the amount of phase change required to move the point 605 until it is at the point 607 of infinite impedance. One implementation of this step is illustrated in FIG. 8B, in which point 605 is moved clockwise to point 607, and the clockwise movement of point 605 is identified with numeral 606. However, it should be appreciated that implementations are possible in which point 605 is moved counterclockwise to point 607 such as, for example, through the addition of a series capacitance.

The amount of phase change required to move the point 605 to location 607 is then converted to a length, in units of λ, a standing wave wavelength, keeping in mind that a complete clockwise revolution around the Smith chart translates into a length of λ/2. For example, with reference to FIG. 8A, assuming that the phase angle 608, as measured from the horizontal axis 601 is −71°, the phase change required to move the point 605 to location 607 is 289°, and the length corresponding to this phase change is (289/360)× (λ/2)=0.4λ.

Referring to the length determined in the foregoing step as ΔX, the required physical length of the line 211a in terms of inches is determined using the following equation:

$$\Delta X \times \frac{c \times 39.37}{f_c \times v_p}$$

, where c is the speed of light in meters per second (3×10⁸ m/sec.), 39.37 is a conversion constant for converting between inches and meters, $f_c$ is the center frequency of the opposing passband of filter 205b at which the impedance of filter 205a is measured, and $v_p$ is the velocity of propagation through the material making up line 211a.

In the foregoing example, assuming $f_c$ is 928 MHz, and $v_p$ is √2 (typical for an RG188-type coaxial cable), the required length of line 211a to give the electrical appearance of infinite impedance is $$.4 \times \frac{300 \times 39.37}{928 \times \sqrt{2}} = 3.6 \text{ inches.}$$

With reference to 4A, the next step of the process is to determine the length, $L_2$, of line 211b using the foregoing analytical procedure. First, the input impedance of filter 205b is determined at the frequency of center frequency of the passband of filter 205a. Such is referred to as $Z_{in}(f_1)$. Then, the impedance is plotted on a Smith chart, and the required phase angle required to achieve the appearance of infinite impedance is determined. Next, the required phase angle is converted to length in terms of units of λ. Finally, the length in terms of λ is put in terms of units of physical length, such as inches or meters.

With reference to FIG. 4B, the next step in the process is to determine the required length, $L_3$, of line 212a. To perform this step, the input impedance of the parallel combination of filters 205a and 205b, and lines 211a and 211b, at node g at the center frequency of the passband of filter 205c, $Z_{in}(f_3)$, is determined. The required physical length of line 212a required to achieve an input impedance, $Z_{in}(f_3)^*$, which appears infinite, is then determined utilizing the foregoing analytical procedure.

Next, the required length, $L_4$, of line 212b is determined. To perform this step, the input impedance of filter 205c at a frequency representative of the passbands of filters 205a and 205b is determined. In the figure, this value is represented as $Z_{in}(f_1, f_2)$. In one implementation, it is assumed that the passbands of filters 205a and 205b are relatively similar, so that it is possible to characterize the two passbands with a single frequency. In one implementation example, this frequency is the average of the center frequencies of the two passbands. The required length of the line, $L_4$, is then determined using the foregoing analytical procedure as the length required to achieve an adjusted input impedance at the representative frequency, $Z_{in}(f_1, f_2)^*$, which appears infinite.

With reference to FIG. 4C, the process continues with the steps of determining the required lengths of the lines 213a and 213b, indicated respectively as $L_5$ and $L_6$. To determine the required length of line 213a, the output impedance of filter 205a at the center frequency of the passband of filter 205b is measured. This value is then plotted on a Smith chart, and the required movement in terms of phase required to achieve the infinite impedance point 607 on the Smith chart is determined. This phase value is then translated into a physical length using the foregoing analytical procedure. The result is the length $L_5$ of line 213a.

The required length of line 213b is then determined by employing a similar procedure. The output impedance of filter 205b at the center frequency of the passband of filter 205a is determined. This value is referred to as $Z_{out}(f_1)$. The required length $L_6$ is then determined at that value which is required to achieve an adjusted output impedance at the center frequency of the passband of filter 213a, $Z_{out}(f_1)^*$, which appears infinite.

Figure 5A:
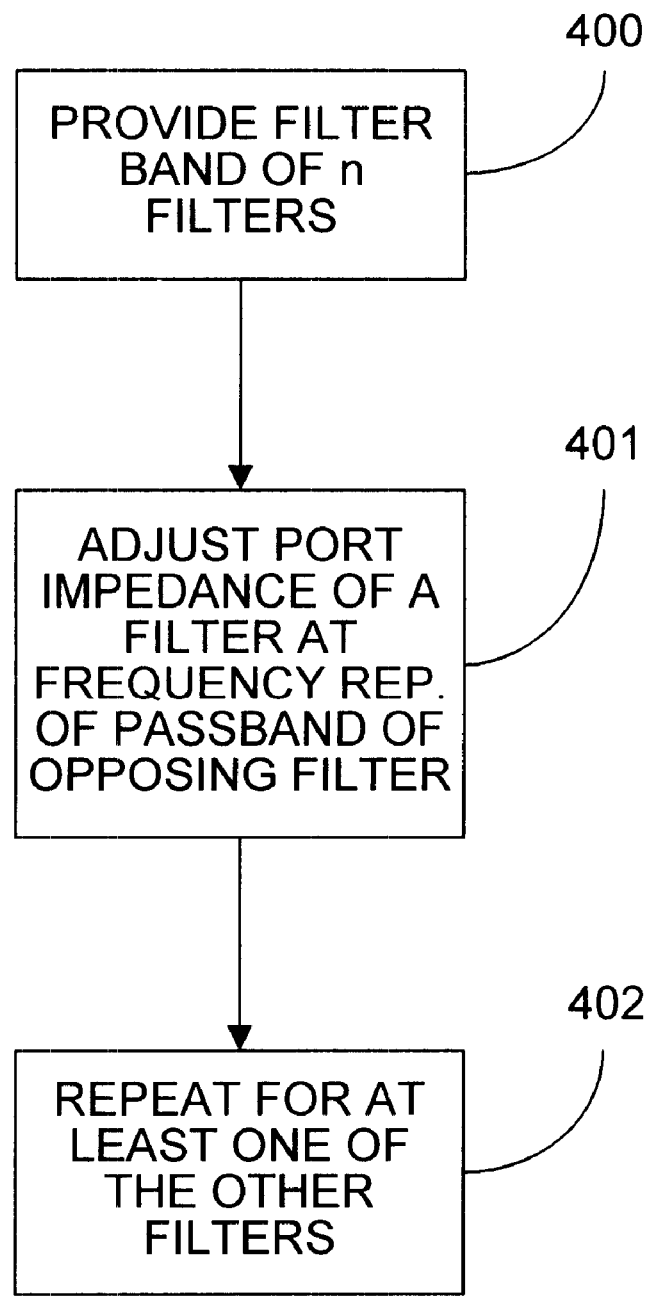
FIG. 5A illustrates a method of implementing a filter system in accordance with the subject invention.

A second embodiment of a method of implementing a filter system of the subject invention is illustrated in FIG. 5A. This figure represents a procedure which is employed for one or more ports, whether input or output, of a filter within a filter system of the subject invention. In step 400, the phase of the reflection coefficient Γ (or the parameter $S_{11}$) at the port of the filter is measured. In step 401, the required length of a transmission line to be coupled to that port is determined based on the phase change which is required to achieve the electrical appearance of infinite appearance at an opposing frequency, that is, a frequency representative of or characteristic of the passbands of one or more other filters within the filter system of the subject invention. Then, in step 402, a transmission line of the length determined in step 401 is coupled to the port of the filter.

Figure 5B:
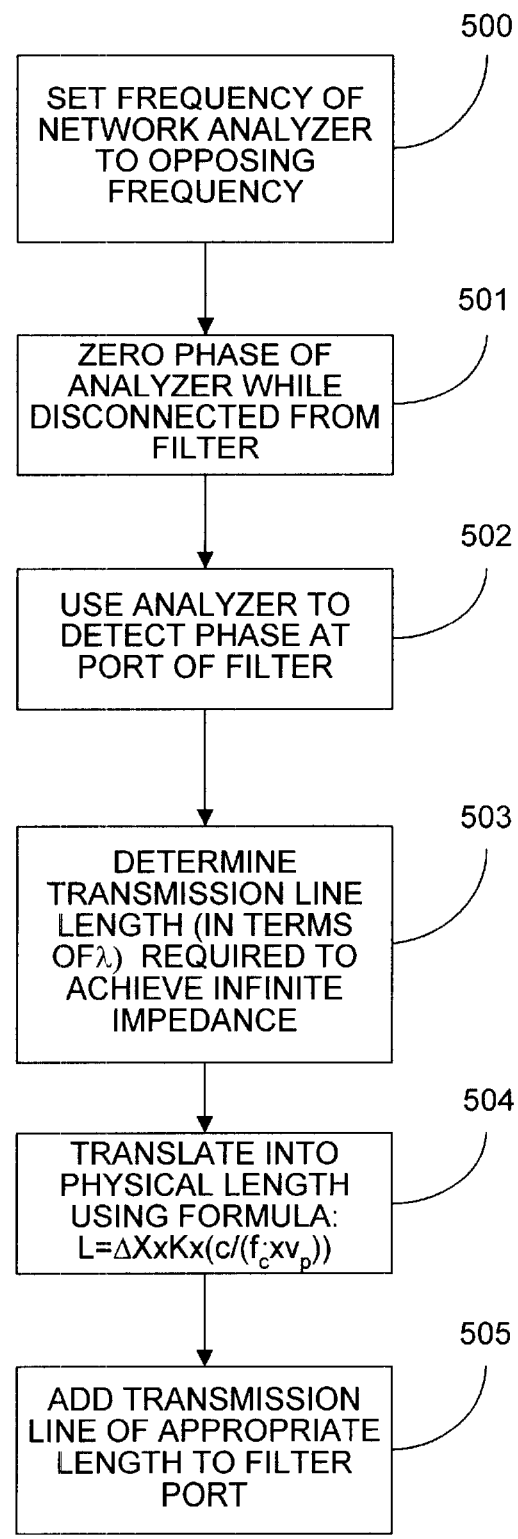
FIG. 5B illustrates one implementation of a method of implementing a filter system in accordance with the subject invention.

FIG. 5B illustrates a third embodiment of a method of implementing a filter system of the subject invention. Again, this method is preferably utilized for one or more ports of at least one filter of the filter system of the subject invention. In step 500, the frequency of a network analyzer is set to an opposing frequency, that is, a frequency representative of or characteristic of the passbands of one or more other filters within the filter system is determined. In step 501, the phase of the network analyzer is calibrated or "zeroed" while disconnected from the filter in question. In step 502, the network analyzer is used to determine the phase of the reflection coefficient at the port of the filter. In step 503, the phase change required to achieve the electrical appearance of infinite impedance at the port of the filter is determined, and the required length of a transmission line in terms of wavelength is determined from that phase change. In step 504, the length from step 503 is translated into a physical length using the formula:

$$\Delta X \times \frac{c \times K}{f_c \times v_p}$$

, the parameters of which have been explained previously, except for K, which is a conversion constant for a desired physical length unit, such as 39.37 inches/meter.

IV. Method of Operation

Figure 9:
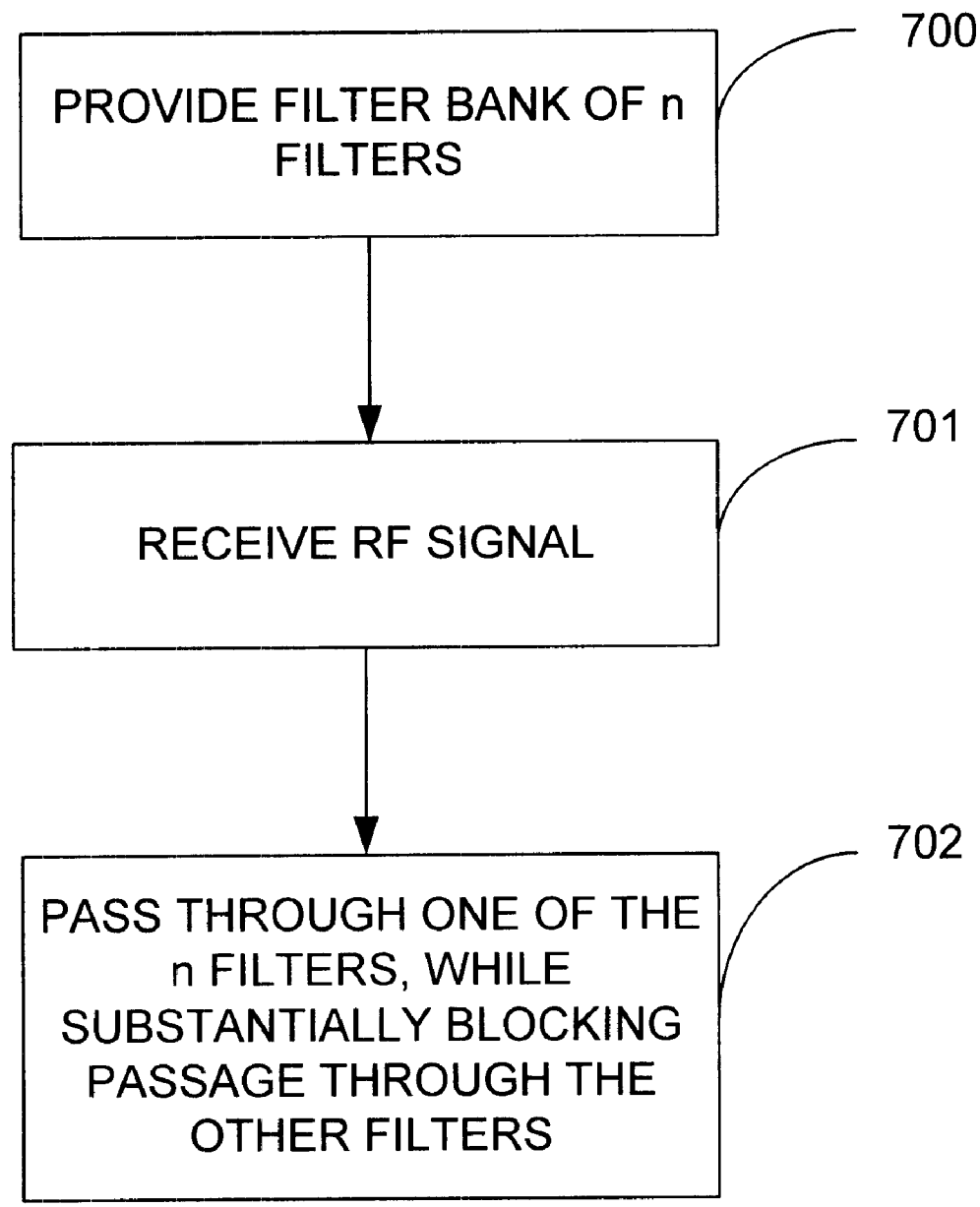
FIG. 9 illustrates a method of operating a filter system of the subject invention.

A method of operating a filter system of the subject invention is illustrated in FIG. 9. In step 700, a filter bank is provided, comprising a bank of n filters, wherein n is an integer greater than or equal to three. In step 701, an RF signal is received. In step 702, the signal is passed through one of the filters in the filter bank having a passband corresponding to the frequency of the signal. while being substantially blocked from passage through the other filters.

V. Other Embodiments

Figure 6:
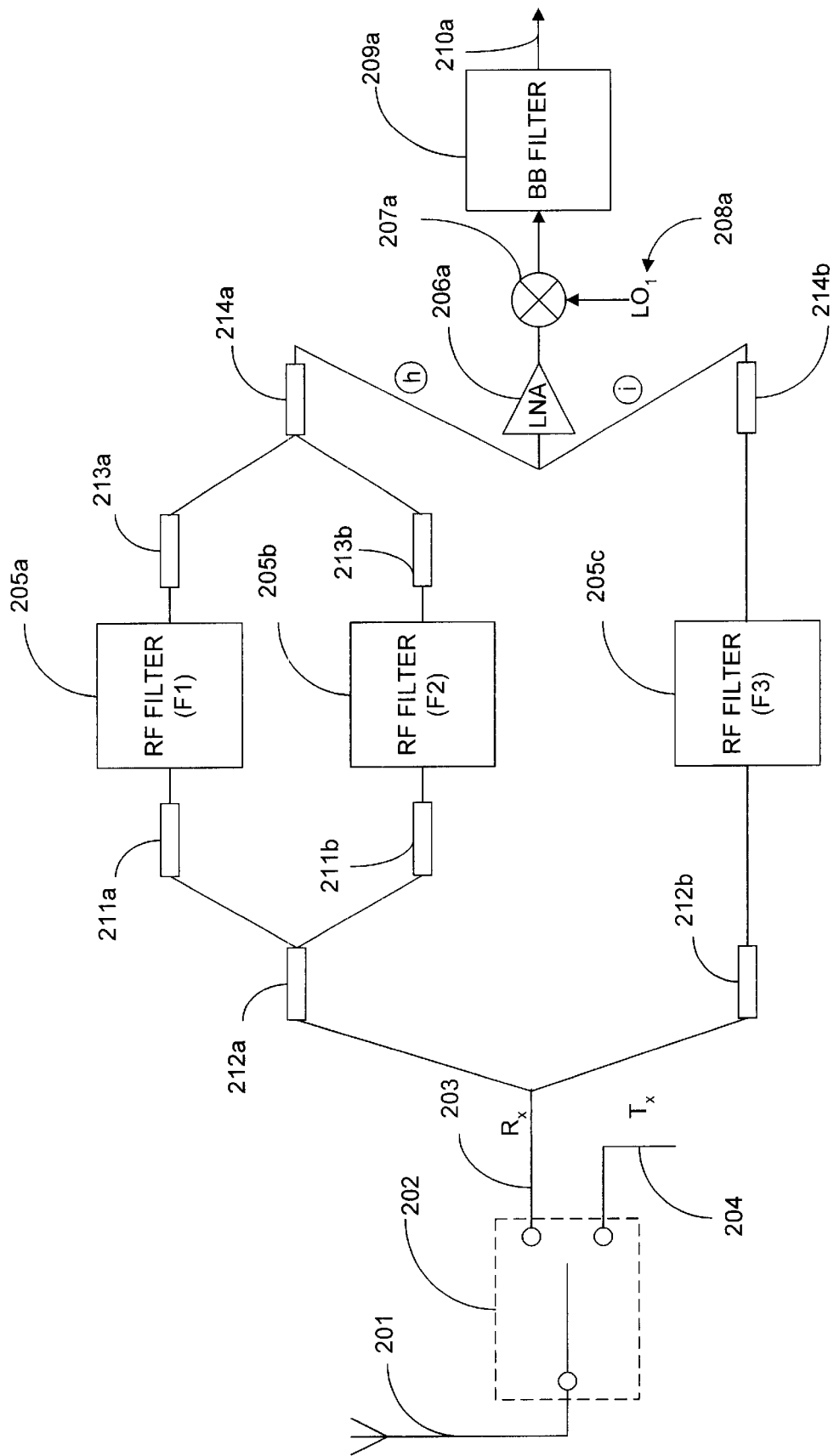
FIG. 6 illustrates a second embodiment of a receiver system in accordance with the subject invention.

Additional embodiments of the subject invention are illustrated in FIGS. 6, and 7A–7C. The embodiment of FIG. 6 is similar to that of FIG. 3, except that each of filters 205a, 205b, 205c is serviced by a single LNA, identified with numeral 206a. This embodiment is suitable in those instances in which a single LNA has sufficient bandwidth to handle the disparity between the passbands of filters 205a, 205b, and 205c. To implement this embodiment, a fifth impedance adjusting network, comprising lines 214a and 214b, must be added. The length of line 214a is selected to achieve the appearance of infinite output impedance for the parallel combination of filters 205a and 205b at node h at the center frequency of the passband of filter 205c. The length of line 214b is selected to achieve the appearance of infinite output impedance for filter 205c at node i at a frequency which is representative of or characteristic of the passbands of filters 205a and 205b.

Figure 7A:
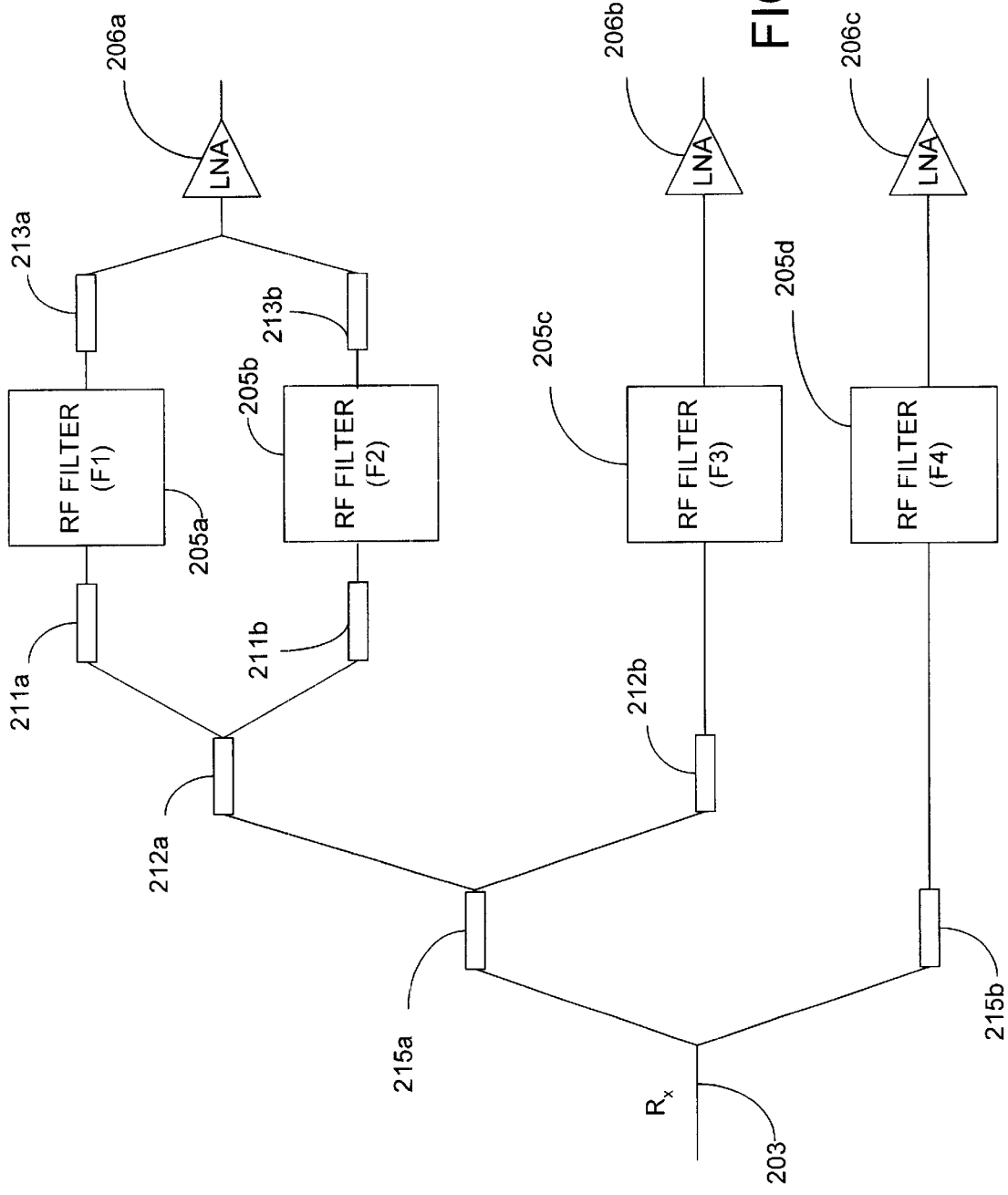
Figure 7B:
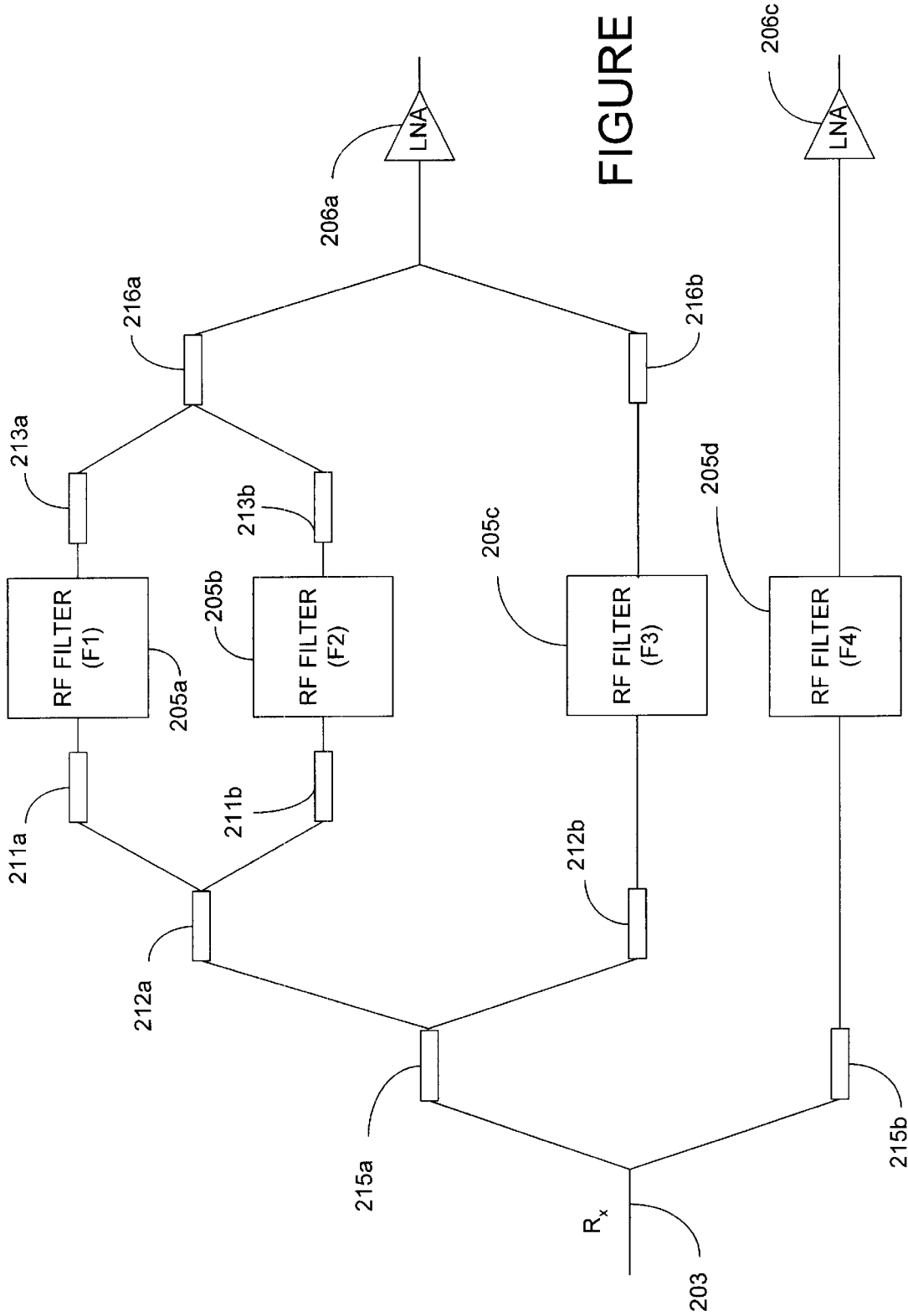

FIGS. 7A–7C illustrate embodiments in which four filters comprise the filter bank of the subject invention. In the FIG. 7A embodiment, the center frequencies of the passbands of filters 205a and 205b are sufficiently close that the two can share a common LNA, identified with numeral 206a. However, filters 205c and 205d are serviced by their own LNAs, identified respectively with numerals 206b and 206c. All four filters in this embodiment are serviced by a single switch (not shown). To couple filter 205d to the switch, a sixth impedance adjusting network, comprising lines 215a and 215b, is added. The lengths of these lines are computed using the analytical procedure previously described.

FIG. 7B illustrates an embodiment in which all four filters share a common input (from a switch, not shown), and in which three filters, identified respectively with numerals 205a, 205b, and 205c, share a common LNA, identified in the figure with numeral 206a, and filter 205d is serviced by its own LNA. To couple filter 205c to LNA 206a, a seventh impedance adjusting network, comprising lines 216a and 216b, is added.

FIG. 7C illustrates an embodiment in which all four filters again share a common input, but in which two of the filters, those identified with numerals 205a and 205b, share a common LNA, identified with numeral 206a, and the other two filters, those identified with numerals 205c and 205d, share a common LNA, identified with numeral 206b.

From the foregoing, it should be appreciated that the subject invention can be generalized to a filter bank comprising n filters, wherein n is an integer equal to three or more, wherein each of the filters is either provided with its own input, or two or more of the filters share a common input, with one or more impedance adjusting networks added between the common input and the inputs of the two or more filters to adjust the input impedances of the filters so that a filter does not unnecessarily load the filter bank at frequencies within the passbands of the other filters. Similarly, embodiments are possible in which each of the n filters is serviced by a different LNA, or in which two or more of the filters share a common LNA, with one or more impedance adjusting networks added between the outputs of the two or more filters, and the common LNA. In this latter case, an impedance adjusting network is added between the outputs of the filters and the common LNA to prevent unnecessary loading by a filter at a frequency within the passband of another one of the filters.

Accordingly, while embodiments, implementations, and implementation examples have been shown and described, it should be appreciated that many more embodiments, implementations, and implementation examples are possible that are within the scope of the subject invention. Consequently, the subject invention is not to be limited except in light of the following claims and their equivalents.

What is claimed is:

1. A filter system comprising:
    first, second and third filters, each having a passband, an input port, and an input port impedance;
    at least one filter system input port; and
    a first impedance adjusting network coupled between at least one filter system input port and the input ports of each of at least two of the filters for adjusting the port impedances of the at least two filters, the first impedance adjusting network comprising a plurality of transmission lines each having lengths such that the adjusted input port impedance of each of the at least two filters coupled to the network, at a frequency representative of the passband of at least one of the other filters coupled to the network, appears infinite, wherein the first impedance adjusting network further comprises third and fourth impedance adjusting networks, wherein the third impedance adjusting network comprises first and second duplexing lines each coupled respectively at one end to the inputs of the first and second filters, the first and second lines coupled together at the other end to form a first node, and third and fourth duplexing lines each coupled at one end respectively to the first node, and the input of the third filter, the third and fourth lines coupled together at the other end to form a second node which comprises a filter system input.

2. The filter system of claim 1 in which the passbands of each of the filters has a center frequency, wherein the length of the first line is such that the adjusted input impedance of the first filter at the center frequency of the passband of the second filter appears infinite, the length of the second line is such that the adjusted input impedance of the second filter at the center frequency of the passband of the first filter appears infinite.

3. The filter system of claim 2 in which the length of the third line is such that the adjusted input impedance at the first node at the center frequency of the passband of the third frequency appears infinite, and the adjusted input impedance of the third filter at a frequency representative of the passbands of the first and second filters appears infinite.

4. A filter system comprising:

first, second and third filters, each having a passband, an input port and an output port, and an input port impedance and an output port impedance;

first and second filter system input ports;

a filter system output port;

a first impedance adjusting network coupled between the first filter system input port and the input ports of the first and second filters for adjusting the input port impedances of the first and second filters, and configured such that the adjusted input port impedance of the first filter, at a frequency representative of the passband of the second filter, is at a non-loading level and the adjusted input port impedance of the second filter, at a frequency representative of the passband of the first filter, is at a non-loading level;

a second impedance adjusting network coupled between the filter system output port and the output ports of the first and second filters for adjusting the output port impedances of the first and second filters, and configured such that the adjusted output port impedance of the first filter, at a frequency representative of the passband of the second filter, is at a non-loading level and the adjusted output port impedance of the second filter, at a frequency representative of the passband of the first filter, is at a non-loading level; and a third impedance adjusting network coupled between the second filter system input port and the input port of the third filter and the first filter system input port for adjusting the input port impedances of the third filter and first filter system input port, and configured such that the adjusted input port impedance of the first filter system input port, at a frequency representative of the passband of the third filter, is at a non-loading level and the adjusted input port impedance of the third filter, at a frequency representative of the passband of the first filter system input port, is at a non-loading level.

5. The filter system of claim 4 wherein the passband of the first filter is generally coincident with the DCS receive band, the passband of the second filter is generally coincident with the PCS receive band, and the passband of the third filter is generally coincident with the GSM or E-GSM receive bands.

6. The filter system of claim 4 wherein the first impedance adjusting network further comprises:

a first transmission line having a length such that the adjusted input impedance of the first filter, at a frequency representative of the passband of the second filter, appears infinite; and a second transmission line having a length such that the adjusted input impedance of the second filter, at a frequency representative of the passband of the first filter, appears infinite.

7. The filter system of claim 6 wherein the first and second transmission lines are duplexing lines.

8. The filter system of claim 4 in which the second impedance adjusting network further comprises:

a first transmission line having a length such that the adjusted output impedance of the first filter, at a frequency representative of the passband of the second filter, appears infinite; and a second transmission line having a length such that the adjusted output impedance of the second filter, at a frequency representative of the passband of the first filter, appears infinite.

9. The filter system of claim 8 wherein the first and second transmission lines are duplexing lines.

10. The filter system of claim 4 wherein the third impedance adjusting network further comprises:

a first transmission line having a length such that the adjusted input impedance of the first filter system, at a frequency representative of the passband of the third filter, appears infinite; and a second transmission line having a length such that the adjusted input impedance of the third filter, at a frequency representative of the passband of the first filter system, appears infinite.

11. The filter system of claim 4 wherein the first and second filters share a common filter system output.

12. The filter system of claim 4 wherein the center frequencies of the first and second filter passbands are substantially close.

13. The filter system of claim 12 wherein the center frequency of the third filter passband is substantially far from the center frequencies of the passbands of the first and second filters.

14. A wireless communication receiver comprising:

an antenna for receiving an RF signal;

a switch switchable between a transmit mode and a receive mode;

a filter system comprising:

first, second and third filters, each having a passband, input and output ports, and input and output port impedances;

first and second filter system input ports configured to receive the RF signal when the switch is in the receive mode;

a filter system output port configured to receive an output of the filter system;

a first impedance adjusting network coupled between the first filter system input port and the input ports of the first and second filters for adjusting the input port impedances of the first and second filters, and configured such that the adjusted input port impedance of the first filter, at a frequency representative of the passband of the second filter, is at a non-loading level and the adjusted input port impedance of the second filter, at a frequency representative of the passband of the first filter, is at a non-loading level;

a second impedance adjusting network coupled between the filter system output port and the output ports of the first and second filters for adjusting the output port impedances of the first and second filters, and configured such that the adjusted output port impedance of the first filter, at a frequency representative of the passband of the second filter, is at a non-loading level and the adjusted output port impedance of the second filter, at a frequency representative of the passband of the first filter, is at a non-loading level; and a third impedance adjusting network coupled between the second filter system input port and the input port of the third filter and the first filter system input port for adjusting the input port impedances of the third filter and first filter system input port, and configured such that the adjusted input port impedance of the first filter system input port, at a frequency representative of the passband of the third filter, is at a non-loading level and the adjusted input port impedance of the third filter, at a frequency representative of the passband of the first filter system, is at a non-loading level;

a LNA configured to receive and amplify the signal from the filter system output port;

a demodulator configured to demodulate the amplified signal to baseband frequencies in one or more stages; and a baseband filter configured to provide a baseband signal from the demodulated signal.

15. A mobile wireless handset incorporating the wireless communication receiver of claim 14.

* * * * *